Patented July 7, 1953

2,644,834

UNITED STATES PATENT OFFICE 2,644,834

PROCESS FOR THE PRODUCTION OF NITRILES

Nicolaas Max, Amsterdam, Netherlands, assignor to Shell Development Company, San Francisco, Calif., a corporation of Delaware No Drawing. Application December 19, 1950, Serial No. 201,681. In the Netherlands December 30, 1949

4 Claims. (Cl. 260—465.1)

This invention relates to a process for the preparation of nitriles by reacting alcohols with ammonia in the presence of a catalyst, and it is particularly directed to the provision of novel catalysts for use in said reaction.

Various catalysts have been heretofore employed for promoting the reaction between alcohols and ammonia in accordance with the illustrative equation:

$$RCH_2OH + NH_3 \rightarrow RCN + H_2O + 2H_2$$

where R is a mono-valent organic radical. Thus, the reaction has been effected by passing primary alcohols along with dry ammonia gas over reduced copper at temperatures of about 300° C. Again combinations of copper and various metal oxides such as $Cu-Al_2O_3$, $Cu-ThO_2$, $Cu-CeO_2$ and $Cu-ZrO_2$ have been used in this reaction. However, these as well as the other catalysts heretofore employed for the purpose have had a relatively limited utility since they are readily poisoned by sulfur as well as other contaminants frequently encountered in carrying out the reaction. Further, the catalysts previously employed in effecting the reaction possess a rather limited activity, particularly when employed with the higher alcohols such as those containing seven or more carbon atoms. With such alcohols, unduly large amounts of higher molecular weight products have been formed, and it has seldom been possible to effect a conversion of alcohol to nitrile as high as 50%.

It is my discovery that no such disadvantages as those mentioned above are encountered when the reaction between alcohol and ammonia is carried out in the presence of a catalyst made up essentially of a metal sulfide having dehydrogenating properties. Particularly good results have been obtained using a zinc sulfide catalyst, though comparable results have also been obtained with such dehydrogenating catalysts as tungsten sulfide, nickel sulfide, vanadium sulfide, magnesium sulfide, titanium sulfide, chromium sulfide and manganese sulfide, for example, as well as with catalysts containing two or more of such sulfides. Thus, excellent results can be obtained by reacting the alcohol with ammonia in the presence of a catalyst made up of a mixture of tungsten sulfide and nickel sulfide. It has been found that such zinc and other metal sulfide catalysts are singularly free of poisoning insofar as the present reaction is concerned, and they permit attainment of high yields of the desired nitrile products, with correspondingly low amounts of higher molecular weight by-products being formed even when higher alcohols ($C_7$ and above) are employed as the starting material.

The catalysts of the present invention can be employed with a wide variety of starting materials. Thus, good results can be obtained with such alcohols as methanol, ethanol, propanol, isopropanol, butanol, hexanol, heptanol, 3,5,5-trimethylhexanol, decanol, lauryl alcohol, cetyl alcohol, stearyl alcohol, benzyl alcohol, 3-phenyl propanol, and the like, as well as with various polyhydric alcohols such as ethylene glycol, propylene glycol and trimethylene glycol. It also forms a feature of this invention to employ alcoholic reactants containing a mixture of various alcohols, each of which is converted to the corresponding nitrile product. As employed herein, the term "alcohol" is intended to designate any primary alcohol having the structure $RCH_2OH$, where R is an alkyl or aralkyl radical which may or may not be substituted, as by one or more other hydroxy groups, or by other groups such as halogen which are non-reactive under the conditions employed in forming the desired nitrile products.

The catalysts employed may be prepared according to conventional processes and may or may not be supported on pumice or other solid materials, as desired. Thus, in the case of zinc sulfide, good results have been obtained with the commercial product having the composition: 89.3% ZnS, 3.1% $ZnCO_3$, 1.7% $ZnSO_4$, 4.5% water and 1.4 insoluble and other materials. Again, equally good or even superior results are obtained with the pure zinc sulfide prepared by addition of hydrogen sulfide to an ammoniacal zinc acetate solution. Another favorable catalyst composed of a mixture of tungsten sulfide and nickel sulfide is prepared by adding a soluble nickel salt to a solution of ammonium thiotungstate and thereafter acidifying the solution, as by the addition of sulfuric acid. The resulting precipitated material is then separated and heated in a reducing atmosphere so as to convert the tungsten trisulfide to tungsten sulfide, as described in U. S. Patent No. 2,528,693, to Johnson, issued November 7, 1950.

In carrying out the process of the present invention, the alcohol and ammonia reactants are passed through the catalyst-containing reaction chamber at a temperature between about 300 and 500° C., and preferably between 350 and 475° C. Atmospheric, subatmospheric or superatmospheric pressures may be employed, though it has been observed that somewhat lower yields of nitriles are obtained in some instances when superatmospheric pressures are employed. The effluent from the catalyst chamber, normally gaseous in character, is then condensed and the nitrile product or products separated from the resulting condensate by fractional distillation or other suitable method.

The reactants are preferably preheated to reaction temperatures before being introduced into the reaction zone, though care should be taken that the preheated reactants are not premixed for any appreciable length of time before being passed over the catalyst since secondary reactions may then occur. Preferably, the reactants are separately preheated and are only brought together in the reaction zone.

As regards the reactant proportions, good results can be obtained by using substantially equimolar amounts of the respective alcohol and ammonia starting materials. However, in the preferred practice of the invention, there is employed from about 1 to 2 moles of ammonia for each mole of alcohol.

The following examples further illustrate the practice of the invention in various of its embodiments, the percentages given therein being by weight unless otherwise stated.

*Example I*

In this operation, n-heptanol was passed in an amount of 1.1 gram moles per hour, together with 1.44 gram moles of anhydrous ammonia per hour, over 250 cc. of catalyst consisting of 200 moles zinc sulfide supported on one liter of pumice pieces measuring approximately 3 to 5 mm. in diameter, the temperature in the reaction zone being maintained at 440 to 460° C., and the reactants being separately preheated before being brought together in the presence of the catalyst. This catalyst was one which had been prepared by making a water paste with a zinc sulfide product made up of 89.3% ZnS, 3.1% $ZnCO_3$, 1.7% $ZnSO_4$, 4.5% water and 1.4% insoluble and other materials, with the pumice pieces being stirred therein until the zinc sulfide was evenly distributed on the surface of the carrier and the pieces no longer adhered to one another. Thereupon the resulting coated granules were dried in a stream of nitrogen at increasing temperatures to about 450° C.

In the course of 195 minutes, there were recovered 350 grams of a product containing 16 grams of compounds boiling below 72° C. (14 mm. Hg), 257 grams of a fraction boiling at 72° C. (14 mm. Hg) and 77 grams of residue. The fraction boiling at 72° C. was proved to be pure heptonitrile, the yield thereof being 60% of theoretical based on the amount of alcohol employed.

*Example II*

3,5,5-Trimethylhexan-1-ol was passed during 204 minutes in an amount of 0.51 gram moles per hour, together with 0.62 gram moles $NH_3$ per hour, over 180 cubic centimeters of the same catalyst, and under the same conditions as described in Example I. From the liquid reaction product there were recovered 177 grams of trimethylcapronitrile boiling within the range of 87–88° C. (18 mm. Hg).

*Example III*

A mixture of $C_7$–$C_9$ alcohols, containing 45% $C_7$, 45% $C_8$ and 10% $C_9$ alcohols, and consisting of both straight as well as branched chain compounds, was passed in an amount of 0.63 gram moles per hour together with 0.74 gram moles $NH_3$ per hour over 180 cubic centimeters of the same catalyst, and under the same conditions as described in Example I. At the end of 195 minutes, there were recovered 150 grams (which is 62% of the theoretical obtainable amount) of a mixture of nitriles boiling in the range from 76–96° C. (19 mm. Hg).

*Example IV*

The foregoing example is repeated under substantially the same conditions, except in this case the catalyst is one containing approximately 1.8 moles of nickel sulfide for each mole of tungsten sulfide, which is employed in the form of pressed pellets. Here the yield of desired mixture of nitrile product compounds is again substantially 60%, based on the amount of the alcoholic starting mixture.

I claim as my invention:

1. A method for producing nitriles which consists of heating an alcohol with ammonia in the presence of a catalyst consisting of at least one metal sulfide of the group consisting of zinc sulfide, tungsten sulfide, nickel sulfide, vanadium sulfide, magnesium sulfide, titanium sulfide and chromium sulfide, and recovering the nitrile product from the resulting mixture.

2. The method of claim 1 wherein the metal sulfide catalyst is a mixture of tungsten sulfide and nickel sulfide.

3. A method for producing nitriles which consists of heating an alcohol with ammonia at a temperature between 300° C. and 500° C. in the presence of a catalyst consisting of at least one metal sulfide of the group consisting of zinc sulfide, tungsten sulfide, nickel sulfide, vanadium sulfide, magnesium sulfide, titanium sulfide and chromium sulfide, said reactants being employed in the ratio of from about 1 to 2 moles of ammonia per mole of alcohol, and recovering the nitrile product from the resulting mixture.

4. A process for preparing nitriles which consists of heating a mixture of $C_7$, $C_8$ and $C_9$ alcohols with an excess of ammonia in the presence of a catalyst consisting of zinc sulfide, said reaction being conducted at a temperature between 300° C. and 500° C., and thereafter recovering $C_7$, $C_8$ and $C_9$ nitriles from the resulting reaction mixture.

NICOLAAS MAX.

References Cited in the file of this patent

UNITED STATES PATENTS

| Number | Name | Date |
|---|---|---|
| 2,053,193 | Guinot | Sept. 1, 1936 |
| 2,337,421 | Spence et al. | Dec. 21, 1943 |
| 2,337,422 | Spence et al. | Dec. 21, 1943 |
| 2,375,016 | Marple et al. | May 1, 1945 |
| 2,388,218 | Olin | Oct. 30, 1945 |
| 2,487,299 | Bishop et al. | Nov. 8, 1949 |
| 2,500,256 | Mahan | Mar. 14, 1950 |

FOREIGN PATENTS

| Number | Country | Date |
|---|---|---|
| 790,262 | France | Nov. 16, 1935 |

OTHER REFERENCES

Mowry: Chem. Reviews, vol. 42, pp. 249–250 (1948).